US012352223B2

(12) United States Patent
Nilsson

(10) Patent No.: US 12,352,223 B2
(45) Date of Patent: Jul. 8, 2025

(54) ALPHA STIRLING ENGINE

(71) Applicant: Energyintel Services Ltd., Nicosia (CY)

(72) Inventor: Martin Nilsson, Gothenburg (SE)

(73) Assignee: EnergyIntel Services Ltd., Nicosia (CY)

( * ) Notice: Subject to any disclaimer, the term of this patent is extended or adjusted under 35 U.S.C. 154(b) by 0 days.

(21) Appl. No.: 18/033,835

(22) PCT Filed: Oct. 20, 2021

(86) PCT No.: PCT/SE2021/051035
§ 371 (c)(1),
(2) Date: Apr. 26, 2023

(87) PCT Pub. No.: WO2022/093094
PCT Pub. Date: May 5, 2022

(65) Prior Publication Data

US 2023/0407811 A1 Dec. 21, 2023

(30) Foreign Application Priority Data

Oct. 30, 2020 (SE) .................................... 2051260-4

(51) Int. Cl.
*F02G 1/044* (2006.01)
*F02B 75/18* (2006.01)
(Continued)

(52) U.S. Cl.
CPC .............. *F02G 1/044* (2013.01); *F02B 75/18* (2013.01); *F02G 1/057* (2013.01); *F02B 75/22* (2013.01); *F02G 2244/08* (2013.01)

(58) Field of Classification Search
CPC .......... F02G 1/043; F02G 1/044; F02G 1/055; F02G 1/057; F02G 2244/08; F02G 2244/10; F02G 2244/12; F02B 75/18; Y02E 10/46
See application file for complete search history.

(56) References Cited

U.S. PATENT DOCUMENTS

| | | | | | |
|---|---|---|---|---|---|
| 5,113,656 | A * | 5/1992 | Swansen ................ | F02B 75/16 | 60/517 |
| 5,172,784 | A * | 12/1992 | Varela, Jr. ............... | B60L 50/62 | 180/65.265 |
| 2010/0186405 | A1* | 7/2010 | Conde ..................... | F02G 1/043 | 60/526 |

FOREIGN PATENT DOCUMENTS

| | | | |
|---|---|---|---|
| JP | 5198450 | A | 8/1976 |
| RU | 2549273 | C1 | 4/2015 |
| SU | 1746019 | A1 | 7/1992 |

OTHER PUBLICATIONS

Patent Cooperation Treaty (PCT), International Search Report and Written Opinion for Application PCT/SE2021/051035 filed Oct. 20, 2021, mailed Nov. 22, 2021, International Searching Authority, SE.
(Continued)

*Primary Examiner* — Loren C Edwards
(74) *Attorney, Agent, or Firm* — McCarter & English, LLP; Dave S. Christensen

(57) ABSTRACT

An alpha type Stirling engine is provided and comprises an expansion cylinder and a compression cylinder. The Stirling engine further comprises a regenerator, a cooler, a heater, and a gas channel which provides the expansion cylinder in fluid communication with the compression cylinder. At least one of the expansion cylinder and the compression cylinder has a twin cylinder which functions as an additional expansion cylinder or an additional compression cylinder, respectively, wherein the one of the expansion cylinder and the
(Continued)

compression cylinder that has a twin cylinder, is together with said twin cylinder connected to a first portion of the gas channel, from which the first portion of the gas channel extends via the regenerator to a second portion to which the other one of the expansion cylinder and the compression cylinder is connected.

4 Claims, 2 Drawing Sheets

(51) Int. Cl.
*F02G 1/057* (2006.01)
*F02B 75/22* (2006.01)

(56) References Cited

OTHER PUBLICATIONS

Saudi Arabian Office Action for Application No. 523440493, dated Jul. 11, 2024, 9 pages.

* cited by examiner

ALPHA STIRLING ENGINE

CROSS-REFERENCE TO RELATED APPLICATION

This application is a 35 U.S.C. § 371 national stage application of PCT Application No. PCT/SE2021/051035 filed on Oct. 20, 2021 entitled "ALPHA STIRLING ENGINE," which claims priority to Sweden Patent Application No. 2051260-4 filed on Oct. 30, 2020, each of which are incorporated herein in their entirety by reference.

TECHNICAL FIELD

The present invention relates to an alpha type Stirling engine comprising an expansion cylinder, a compression cylinder, a regenerator, a cooler, and a heater.

BACKGROUND

Thermal energy can be converted into electrical energy in several ways. Some systems use Stirling engines as a generator to generate electrical energy from thermal energy. Stirling engines are external, closed-cycle engines which use an external heat source to expand a working gas which drives one or more pistons.

Further, Stirling engines in combination with a thermal energy storage can be used to utilize excess power from e.g. photovoltaic power plants and wind turbines. Instead of curtailing the power when the output of such power plants exceeds electricity demand, the excess power is used to, for instance, charge the thermal energy storage thus making it possible to later draw energy from said storage when demand for electricity exceeds available output from these intermittent renewable sources. It is then possible to use a Stirling engine to convert the thermal energy to electricity.

An alpha arranged Stirling engine has two separate cylinders, which may be inline, parallel or in a V-arrangement. Of the two cylinders, one is hot and the other is cold. The hot cylinder is situated inside or connected to the high temperature heat exchanger and the cold cylinder is situated inside or connected to the low temperature heat exchanger.

The efficiency of Stirling engines depends on many factors such as the type of engine, the working gas used in the engine and the efficiency of the various components within the Stirling engine such as the regenerator.

Generally, the larger the Stirling engines are, the more power they can produce. Some designs results in high working pressures in the cylinders.

SUMMARY

It is an object of the present invention to provide an alpha type Stirling engine with improved durability. This is achieved with a Stirling engine as described in the appended claims.

The present invention is based on the realization that by increasing the number of cylinders at the end of a gas channel which fluidly interconnects a compression cylinder with an expansion cylinder, but reducing the piston area in those increased number of cylinders, the force on each piston may be reduced without compromising power output. Hereby, the strain on components connected to the piston and on the piston itself can be reduced.

According to a first aspect of the present disclosure an alpha type Stirling engine comprises an expansion cylinder and a compression cylinder, the Stirling engine further comprises a regenerator, a cooler, a heater, and a gas channel which provides the expansion cylinder in fluid communication with the compression cylinder. At least one of the expansion cylinder and the compression cylinder has a twin cylinder which functions as an additional expansion cylinder or an additional compression cylinder, respectively. The one of the expansion cylinder and the compression cylinder that has a twin cylinder is together with said twin cylinder connected to a first portion of the gas channel, from which first portion the gas channel extends via the regenerator to a second portion to which the other one of the expansion cylinder and the compression cylinder is connected. For instance, by dividing the piston area of a single cylinder into two equally large cylinders that has a total piston area that equals the piston area of the first single cylinder, the power output from the Stirling engine is maintained but the force on each of the pistons is reduced to 50%. Thus, the strain on the pistons and maybe more importantly, the strain on the components connected to the pistons are reduced. As a result, the durability is increased.

It should be understood that in this disclosure the term twin cylinder means that it has the same functionality as the cylinder to which it is a twin. Thus, a twin cylinder of an expansion cylinder is also an expansion cylinder. A twin cylinder of a compression cylinder is also a compression cylinder. It should be understood that there is no strict requirement of a perfectly synchronized movement. The gist of the present inventive concept, i.e. to distribute the required force needed to push the gas into the gas channel, may be implemented also with a pair of cylinders that are not perfectly synchronized.

From the above it should thus be understood that in some exemplary embodiments, the expansion cylinder has a twin cylinder, i.e. there is a pair of expansion cylinders connected to a first portion of the gas channel. The pistons in the expansion cylinder will by means of their strokes press the gas to the first portion and via the regenerator to the compression cylinder (and an optional additional compression cylinder).

Similarly, in other exemplary embodiments the compression cylinder has a twin cylinder, i.e. there is a pair of compression cylinders connected to a first portion of the gas channel. The pistons in the compression cylinder will by means of their strokes press the gas to the first portion and via the regenerator to the expansion cylinder (and an optional additional expansion cylinder).

Furthermore, in some exemplary embodiments, the expansion cylinder has a twin cylinder, i.e. an addition expansion cylinder, so that a pair of expansion cylinders is present, and the compression cylinder also has a twin cylinder, so that a pair of compression cylinders is also present. The pair of expansion cylinders may be connected to the first portion of the gas channel, while the pair of compression cylinders may be connected to the second gas channel. The regenerator will be between the first portion and the second portion, thus seen from a fluid flow perspective, the pair of compression cylinders are commonly located on one side of the regenerator, while the pair of expansion cylinders are commonly located on another side of the regenerator.

By using the same gas channel portion for two relatively small cylinders a high power output is still obtainable but with less strain on sensitive components.

Thus, from above it can be understood that according to another aspect of the present disclosure, both the expansion cylinder and the compression cylinder have a twin cylinder, respectively, wherein the expansion cylinder and its twin cylinder are connected to the first portion of the gas channel, while the compression cylinder and its twin cylinder are connected to the second portion of the gas channel.

Further, according to an aspect of the present disclosure the twin cylinders are arranged parallel to the expansion cylinder and/or the compression cylinder, respectively. Thus, the pair of pistons in the cylinders on the expansion side and/or the compression side, may be arranged to move in a synchronized way. However, a slight trailing of one of the pistons is conceivable.

According to at least one exemplary embodiment, the one of the expansion cylinder and the compression cylinder that has a twin cylinder comprises a piston configured to move along a first geometrical axis, wherein its twin cylinder comprises a piston configured to move along a separate second geometrical axis, wherein the first and the second geometrical axes are parallel with each other. By having the pistons arranged in parallel in this way the stroke controlling mechanism may be facilitated.

According to an alternative aspect, twin cylinders are instead arranged in line with the expansion cylinder and/or the compression cylinder, respectively, with the cylinder heads facing each other. This setting could be advantageous for some solutions.

According to yet another aspect of the present disclosure, the expansion and compression cylinders are configured in a V-arrangement. In a completely mechanical arrangement with a crank shaft, a V-arrangement is often practical (the pistons may point toward a common shaft).

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
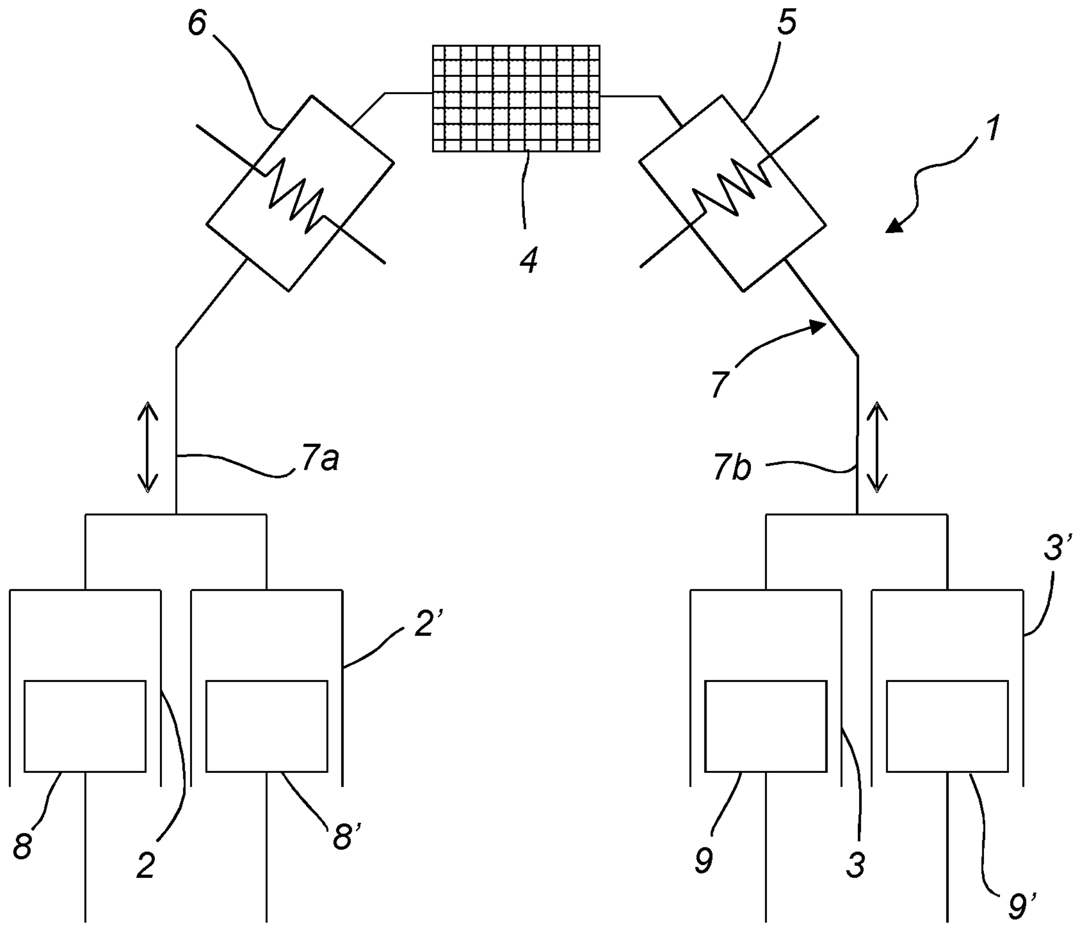
FIG. 1 is a schematic drawing of a Stirling engine according to the present disclosure.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With reference to FIG. 1, the alpha type Stirling engine 1 comprises an expansion cylinder 2 and a compression cylinder 3. It further comprises a regenerator 4, a cooler 5, and a heater 6. The expansion cylinder 2 Furthermore, the Stirling engine comprises a gas channel 7 which provides the expansion cylinder (2) in fluid communication with the compression cylinder (3). As shown in FIG. 1, both the expansion cylinder 2 and the compression cylinder 3 have a twin cylinder 2', 3', respectively. However, in other exemplary embodiments, it is conceivable that only one of the expansion cylinder 2 and the compression cylinder 3 has a twin cylinder. This will at least reduce the strain on one of the cylinders compared to if a single cylinder solution is used on on both the compression side and the expansion side of the regenerator 4.

From a fluid path perspective, the expansion cylinder 2, its twin cylinder 2' and the heater 6 are provided on one side of the regenerator 4. The compression cylinder 3, its twin cylinder 3' and the cooler 5 are provided on the other side of the regenerator 4.

The twin cylinders 2', 3' function as additional expansion and compression cylinders 2, 3, respectively. The expansion cylinder 2 and its twin cylinder 2' are both connected to a first portion **7*a* of the gas channel 7. The compression cylinder 3 and its twin cylinder 3' are both connected to a second portion 7*b* of the gas channel 7. Each one of the cylinders 2, 2', 3, 3' has a reciprocating piston 8, 8', 9, 9', respectively. The gases pushed by the pistons 8, 8' of the pair of expansion cylinders 2, 2' are joined in the first portion 7*a* of the gas channel 7 and transported via the regenerator to the second portion 7*b* of the gas channel 7 and the distributed to the compression cylinders 3, 3', whereby the pistons 9, 9' of the compression cylinders will perform a retracting motion of its stroke. Correspondingly, when the pistons 9, 9'** are advanced to push the gas, the flow will be in the opposite direction.

By having a common gas channel 7 with which the pair of compression cylinders 3, 3' the pair of expansion cylinders 2, 2' interact, the forces needed to drive the pistons 8, 8', 9, 9' to achieve the desired gas flow in the gas channel 7 can be reduced for the individual pistons without compromising on power output.

As further can be seen in FIG. 1, the twin cylinders 2', 3', the expansion and compression cylinders 2, 3 are arranged parallel with one another in pairs, respectively. In particular, the pair of expansion cylinders 2, 2' are arranged along separate but parallel geometrical axes, along which the respective piston 8, 8' moves. Similarly, the pair of compression cylinders 3, 3' are arranged along separate but parallel geometrical axes, along which the respective piston 9, 9' moves.

Figure 2:
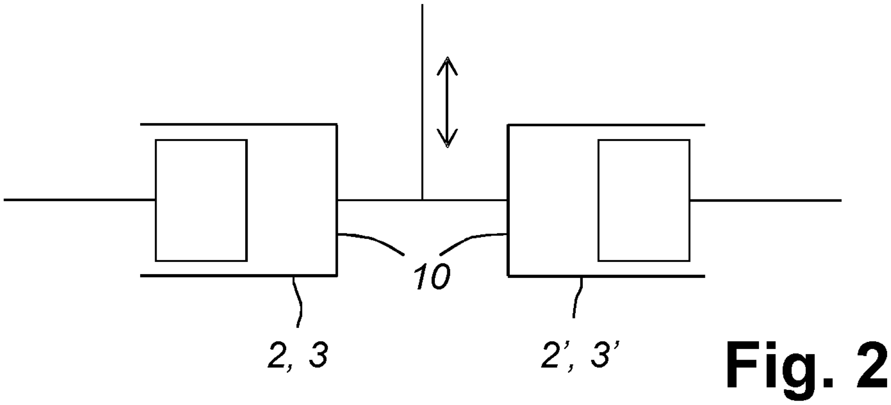
FIG. 2 is a schematic drawing of an alternative setup of twin cylinders according to the present disclosure.

Moving on to FIG. 2, the twin cylinders 2', 3' are arranged in line with the expansion cylinder 2 and/or the compression cylinder 3, respectively, with the cylinder heads 10 facing each other. One advantage is that the cylinders or rather the pistons will balance each other throughout the strokes.

Figure 3:
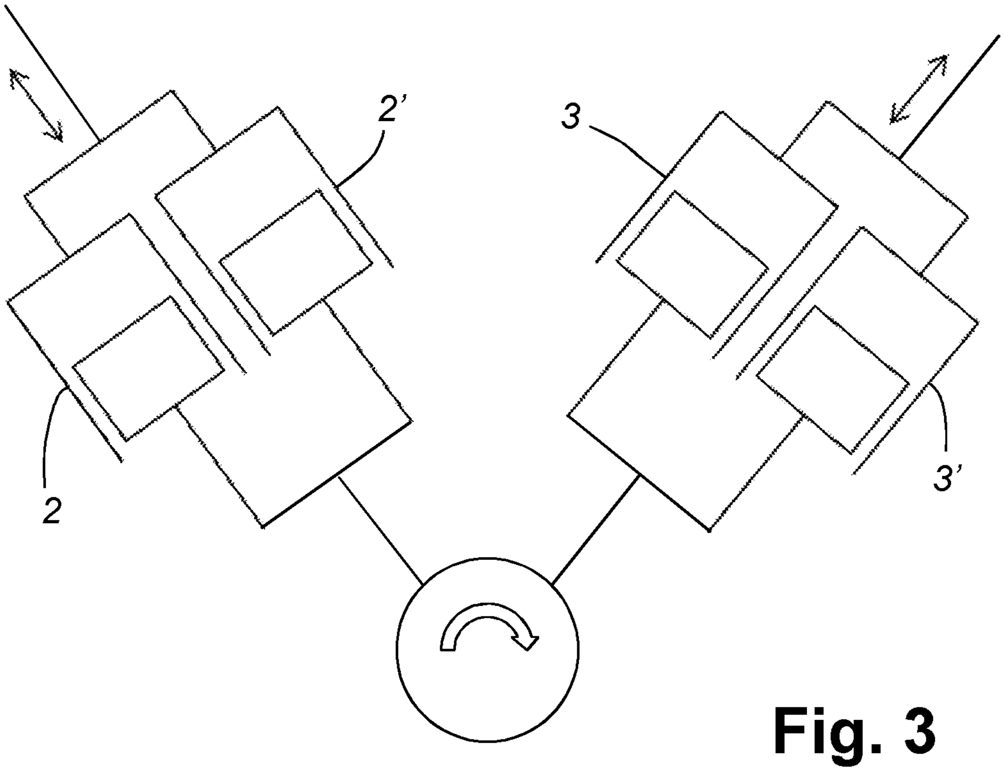
FIG. 3 is a schematic drawing of a V-type Stirling engine according to another exemplary embodiment of the present disclosure.

In FIG. 3, it is schematically shown how the cylinders 2, 2', 3, 3' are arranged or configured in a V-arrangement. The two pairs of cylinders are turned 90 degrees for facilitating understanding. From one side where the V-shape is visible, only one cylinder will be visible for each "leg" of the V. Also in this configuration the movements of the pistons in the expansion cylinder 2 and its twin cylinder 2' are along parallel geometrical axes. Similarly, the movements of the pistons of the compression cylinder 3 and its twin cylinder 3' are along parallel geometrical axes.

It is to be understood that the present invention is not limited to the embodiments described above and illustrated in the drawings; rather, the skilled person will recognize that many changes and modifications may be made within the scope of the appended claims. For example, the arrangement shown in FIG. 2, with the cylinder heads 10 facing each other, could be applied to the V-arrangement of FIG. 3.

The invention claimed is:

1. An alpha type Stirling engine comprising:

an expansion cylinder;

a compression cylinder;

a regenerator, a cooler, a heater, and a gas channel which provides the expansion cylinder in fluid communication with the compression cylinder;

wherein at least one of the expansion cylinder and the compression cylinder has a twin cylinder which functions as an additional expansion cylinder or an additional compression cylinder, respectively, and wherein the one of the expansion cylinder and the compression cylinder that has the twin cylinder, is together with the twin cylinder connected to a first portion of the gas channel, from which the first portion of the gas channel extends via the regenerator to a second portion to which the other one of the expansion cylinder and the compression cylinder is connected;

wherein the twin cylinder, the expansion cylinder and the compression cylinder each have a cylinder head having a surface proximal to the gas channel, wherein the twin cylinder is arranged in line with at least one of the expansion cylinder and the compression cylinder, with the surface of the respective cylinder heads facing each other.

2. The Stirling engine according to claim 1, wherein both the expansion cylinder and the compression cylinder have a twin cylinder, respectively, wherein the expansion cylinder and the twin cylinder of the expansion cylinder are connected to the first portion of the gas channel, while the compression cylinder and the twin cylinder of the compression cylinder are connected to the second portion of the gas channel.

3. The Stirling engine according to claim 1, wherein the twin cylinder is arranged parallel to at least one of the expansion cylinder and the compression cylinder.

4. The Stirling engine according to claim 1, wherein the one of the expansion cylinder and the compression cylinder that has the twin cylinder comprises a piston configured to move along a first geometrical axis, wherein the twin cylinder comprises a piston configured to move along a separate second geometrical axis, wherein the first geometrical axis and the second geometrical axis are parallel with each other.

* * * * *